(12) United States Patent
Ma et al.

(10) Patent No.: US 7,727,596 B2
(45) Date of Patent: Jun. 1, 2010

(54) METHOD FOR FABRICATING A COMPOSITE GAS SEPARATION MODULE

(75) Inventors: Yi Hua Ma, Worcester, MA (US); Federico Guazzone, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 638 days.

(21) Appl. No.: 10/896,743

(22) Filed: Jul. 21, 2004

(65) Prior Publication Data

US 2006/0016332 A1 Jan. 26, 2006

(51) Int. Cl.
*B05D 5/00* (2006.01)
*B01D 53/00* (2006.01)

(52) U.S. Cl. ............... 427/419.1; 427/205; 427/443.1; 427/427; 427/446; 427/595; 427/255.28

(58) Field of Classification Search .................. None
See application file for complete search history.

(56) References Cited

U.S. PATENT DOCUMENTS

| | | | |
|---|---|---|---|
| 2,958,391 A | 11/1960 | deRosset | |
| 3,241,298 A | 3/1966 | Pierce | |
| 3,413,777 A | 12/1968 | Langley, et al. | |
| 3,428,476 A | 2/1969 | Langley, et al. | |
| 3,438,178 A * | 4/1969 | Betteridge et al. | 95/104 |
| 3,717,525 A | 2/1973 | Bültemann | |
| 4,496,373 A | 1/1985 | Behr et al. | |
| 4,589,891 A | 5/1986 | Iniotakis et al. | |
| 4,699,637 A | 10/1987 | Iniotakis et al. | |
| 4,857,080 A | 8/1989 | Baker et al. | |
| 5,049,167 A | 9/1991 | Castro et al. | |
| 5,139,541 A | 8/1992 | Edlund | |
| 5,205,841 A | 4/1993 | Vaiman | |
| 5,215,729 A | 6/1993 | Buxbaum | |
| 5,217,506 A | 6/1993 | Edlund et al. | |
| 5,259,870 A | 11/1993 | Edlund | |
| 5,358,553 A | 10/1994 | Najjar et al. | |
| 5,393,325 A | 2/1995 | Edlund | |
| 5,449,848 A | 9/1995 | Itoh | |
| 5,451,386 A | 9/1995 | Collins et al. | |
| 5,498,278 A | 3/1996 | Edlund | |
| 5,614,001 A | 3/1997 | Kosaka et al. | |
| 5,652,020 A | 7/1997 | Collins et al. | |
| 5,672,388 A | 9/1997 | McHenry et al. | |
| 5,738,708 A | 4/1998 | Peachey et al. | |
| 5,782,959 A | 7/1998 | Yang et al. | |
| 5,782,960 A | 7/1998 | Ogawa et al. | |
| 5,895,769 A | 4/1999 | Lai | |
| 5,904,754 A | 5/1999 | Juda et al. | |
| 6,152,987 A * | 11/2000 | Ma et al. | 95/56 |
| 6,152,995 A | 11/2000 | Edlund | |
| 6,183,542 B1 | 2/2001 | Bossard | |
| 6,267,801 B1 | 7/2001 | Baake et al. | |
| 6,309,546 B1 | 10/2001 | Herrmann et al. | |
| 6,372,363 B1 | 4/2002 | Krueger | |
| 6,379,524 B1 | 4/2002 | Lee et al. | |
| 6,419,728 B1 | 7/2002 | Edlund | |
| 6,452,276 B1 | 9/2002 | Cohen et al. | |
| 6,475,268 B2 | 11/2002 | Thornton | |
| 6,547,858 B1 | 4/2003 | Edlund et al. | |
| 6,596,057 B2 | 7/2003 | Edlund et al. | |
| 6,916,454 B2 | 7/2005 | Alvin | |
| 6,964,697 B2 | 11/2005 | Pan et al. | |
| 7,018,446 B2 | 3/2006 | Alvin et al. | |
| 2002/0081845 A1 | 6/2002 | Lee et al. | |
| 2002/0083829 A1 | 7/2002 | Edlund et al. | |
| 2002/0838829 | 7/2002 | Edlund et al. | |
| 2002/0141919 A1 | 10/2002 | Alvin | |
| 2002/0175418 A1 | 11/2002 | Cohen et al. | |
| 2003/0183080 A1 | 10/2003 | Mundschau | |
| 2003/0190486 A1 | 10/2003 | Roa et al. | |
| 2003/0213365 A1 | 11/2003 | Jantsch et al. | |
| 2004/0037962 A1 | 2/2004 | Uemura et al. | |

(Continued)

FOREIGN PATENT DOCUMENTS

EP 1208904 A1 5/2002

(Continued)

OTHER PUBLICATIONS

Gryaznov, V. M., "Metal Containing Membranes for the Production of Ultrapure Hydrogen and the Recovery of Hydrogen Isotopes," *Separation and Purification Methods* (now *Separation and Purification Reviews*), 29(2):171-187 (2000).

(Continued)

*Primary Examiner*—William Phillip Fletcher, III
(74) *Attorney, Agent, or Firm*—Hamilton, Brook, Smith & Reynolds, P.C.

(57) ABSTRACT

A method for fabricating a composite gas separation module includes depositing a preactivated powder over a porous substrate; depositing a binder metal onto the preactivated powder; and depositing a dense gas-selective membrane to overlie the preactivated powder and binder metal, thereby forming the composite gas separation module. The preactivated powder can be, for example, selected from the group consisting of preactivated metal powders, preactivated metal oxide powders, preactivated ceramic powders, preactivated zeolite powders, and combinations thereof. The preactivated powder can be deposited, for example, from a slurry such as a water-based slurry. In some embodiments, the dense gas-selective membrane is a dense hydrogen-selective membrane.

36 Claims, 2 Drawing Sheets

U.S. PATENT DOCUMENTS

| | | | |
|---|---|---|---|
| 2004/0244589 | A1 | 12/2004 | Bossard et al. |
| 2005/0072304 | A1 | 4/2005 | Etievant et al. |
| 2006/0188737 | A1 | 8/2006 | Roa et al. |

FOREIGN PATENT DOCUMENTS

| | | | |
|---|---|---|---|
| EP | 1277512 A1 | | 1/2003 |
| JP | 62-259884 A | * | 11/1987 |
| JP | 05-123548 | | 5/1993 |
| JP | 10-028850 A | | 2/1998 |
| WO | WO 99/33545 A1 | | 7/1999 |
| WO | WO 03/011433 A1 | | 2/2003 |
| WO | WO 2004/098751 | | 11/2004 |
| WO | WO 2005/075060 A1 | * | 8/2005 |

OTHER PUBLICATIONS

Gryaznov, V. M., et al., "Preparation and catalysis over Palladium Composite Membranes," *Applied Catalysis A: General*, 96:15-23 (1993).

Ma, Y. H., et al., "Characterization of Intermetallic Diffusion Barrier and Alloy Formation for Pd/Cu and Pd/Ag Porous Stainless Steel Composite Membranes," *I & EC Research*, 43:2936-2945 (2004).

Ma, Y. H.; et al., "Thin Composite Palladium and Palladium/Alloy Membranes for Hydrogen Separation," *Ann. N.Y. Acad. Sci.*, 984:346 (2003).

Mardilovich, I. P., et al., "Dependence of Hydrogen Flux on the Pore Size and Plating Surface Topology of Asymmetric Pd-Porous Stainless Steel Membranes," *Desalination*, 144:85-89 (2002).

Nam, S.-E., et al., "Hydrogen Separation by Pd Alloy Composite Membranes," *J. Membrane Sci.*, 192:177-185 (2001).

Ozaki, T., et al., "Preparation of Palladium-coated V and V-15 Ni Membranes for Hydrogen Purification by Electroless Plating Technique," *Int. J. Hydrogen Energy*, 28:297 (2003).

Roa, F., "Preparation and Characterization of Pd-Cu Composite Membranes for Hydrogen Separation," *Chem. Eng. J.*, 93:11 (2003).

Roa, F., et al., "The Influence of Alloy Composition on the $H_2$ Flux of Composite Pd-Cu Membranes," *Desalination*, 147:411-416 (2002).

Shu, J., et al., "Structurally Stable Pd-Ag Alloy Membranes: Introduction of a Diffusion Barrier," *Thin Solid Films*, 286:72-79 (1996).

* cited by examiner

METHOD FOR FABRICATING A COMPOSITE GAS SEPARATION MODULE

BACKGROUND OF THE INVENTION

Gas separation modules are commonly used to selectively separate a particular gas from a gas mixture. Two of the most common gas separation modules are polymer membranes and metallic composites. Polymer membranes can provide an effective and cost-efficient option for separating a gas at low temperatures. Where separations must be performed in conjunction with high-temperature processing, however, polymer membranes are generally unsuitable because they tend to thermally decompose.

The development of high-temperature processing, along with tighter environmental regulations, requires utilization of gas separation modules that provide high flux, high selectivity of separation, and the ability to operate at elevated temperatures. Instead of polymers, metallic composite modules can be employed to serve these needs. A composite gas separation module can consist of a metallic membrane having selective gas permeability mounted on a porous substrate.

An area of high-temperature gas separation that is of particular interest is the separation and purification of hydrogen gas from a reaction gas mixture. A composite module for selectively separating hydrogen gas at high temperatures can include a palladium (Pd) membrane. Ideally, the palladium membrane is permeable to hydrogen but not to other gases. When hydrogen gas ($H_2$) contacts the membrane, the hydrogen molecules dissociate and hydrogen atoms diffuse into the membrane. Accordingly, hydrogen can selectively pass from a surrounding atmosphere through the palladium membrane. The selectively separated hydrogen atoms then reassociate into $H_2$ gas and pass into a volume on the opposite side of the module.

Porous substrates used in the fabrication of composite gas separation modules can have broad pore size distributions and/or rough surfaces such that thick gas-selective membranes can be needed to effectively separate gases. Generally, as the thickness of the gas-selective membrane increases, gas flux through the gas separation module decreases.

Therefore, a need exists for composite gas separation modules (and methods for their fabrication) that overcome or minimize the above-referenced problems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

SUMMARY OF THE INVENTION

Figure 1A:
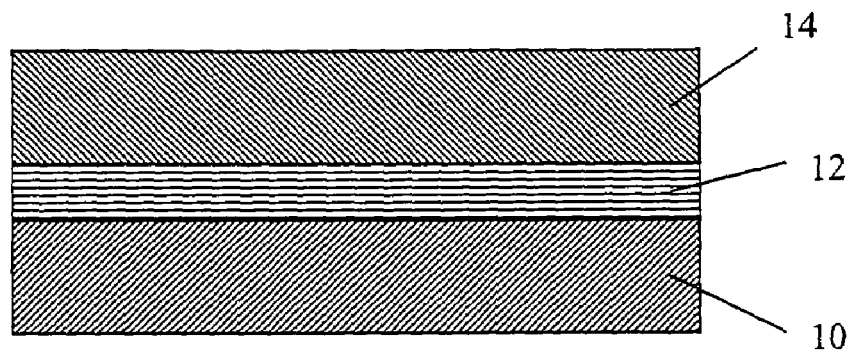
FIGS. 1A to 1D are partial cross-section representations of composite gas separation modules of various embodiments of the present invention.

The present invention relates to composite gas separation modules and to methods for fabricating composite gas separation modules. The present invention also relates to methods for selectively separating hydrogen gas from a hydrogen gas-containing gaseous stream.

In one embodiment, the composite gas separation module includes a porous substrate; an intermediate layer at the porous substrate that includes particles and a binder metal, wherein the binder metal is uniformly distributed throughout the intermediate layer; and a dense gas-selective membrane, wherein the dense gas-selective membrane overlies the intermediate layer. The intermediate layer can be a continuous or a discontinuous layer. In one embodiment, at least part of the intermediate layer is in pores of the porous substrate and/or covers pores of the porous substrate. In some embodiments, the intermediate layer generally overlies the porous substrate. The dense gas-selective membrane can include, for example, palladium or an alloy thereof.

A method for fabricating a composite gas separation module includes depositing a preactivated powder over a porous substrate; depositing a binder metal onto the preactivated powder; and depositing a dense gas-selective membrane to overlie the preactivated powder and binder metal, thereby forming the composite gas separation module. The method can further include the step of surface activating a powder to form the preactivated powder. For example, the powder can be seeded with nuclei of a hydrogen-selective metal. The present invention also relates to a composite gas separation module formed by this method.

The present invention also includes a method for conditioning a composite gas separation module. The method comprises the step of treating a composite gas separation module with hydrogen gas at a temperature of up to about 250° C.

In one embodiment of the invention, a method for selectively separating hydrogen gas from a hydrogen gas-containing gaseous stream includes the step of directing the hydrogen gas-containing gaseous stream to a composite gas separation module, wherein the composite gas separation module includes a porous substrate; an intermediate layer at the porous substrate that includes particles and a binder metal, wherein the binder metal is uniformly distributed throughout the intermediate layer; and a dense hydrogen-selective membrane, wherein the dense hydrogen-selective membrane overlies the intermediate layer. By this method, hydrogen gas is at least partially partitioned from the gaseous stream by passing through the dense hydrogen-selective membrane.

The performance of composite gas separation modules can be limited by the thickness of the constituent dense gas-selective membrane; the number and size of defects in the membrane (e.g., pores, holes, cracks or other physical conditions that impair the gas-selectivity of the composite gas separation module by allowing the passage of an undesired gas); and the composition of the membrane. To obtain efficient separation, a dense gas-selective membrane should not be breached by regions or points which do not produce the desired gas selectivity by allowing the passage of an undesired gas.

In one embodiment, the intermediate layer effectively reduces the pore size of the support. For example, in one embodiment, at least part of the intermediate layer fills or covers pores of the porous substrate, thereby effectively reducing the size of those pores. In one embodiment, a graded support is formed by applying an intermediate layer, as described herein, to a porous substrate. Since the effective pore size of the support is made smaller, less gas-selective material can be used to form a dense gas-selective membrane. Thus, a composite gas separation module having a dense gas-selective membrane thinner than dense gas-selective membranes of most conventionally produced composite gas separation modules can be fabricated. Forming a thinner dense gas-selective membrane can also simplify manufacturing by reducing the number of layers of gas-selective material that must be applied to the porous substrate to form the dense gas-selective membrane. Therefore, practice of the present invention can reduce manufacturing costs, e.g., material, labor and capital costs, for fabricating composite gas separation modules as compared to conventional fabrication techniques.

Since thinner dense gas-selective membranes typically produce higher rates of gas flux, composite gas separation modules fabricated as described herein can produce higher rates of gas flux, e.g., hydrogen flux. Thus, gas separation processes utilizing the composite gas separation modules described herein can achieve higher rates of gas separation than is generally possible using conventional composite gas separation modules employing thicker dense gas-selective membranes.

In addition, practice of the present invention can protect against diffusion of substrate components into the dense gas-selective membrane. In general, at high temperatures, rates of intermetallic diffusion of metal atoms between adjacent structures of the composite gas separation module can become significant. For example, at high temperatures metal atoms of porous metal substrates can diffuse at a significant rate into dense hydrogen-selective membranes. A dense hydrogen-selective membrane into which substrate components have diffused can produce reduced flux of a desired gas through the membrane. By preventing or reducing the diffusion of substrate components into the dense gas-selective membrane, the gas permeation flux through the composite gas separation module can be maintained throughout operation of the composite gas-separation module in a gas separation process.

The methods described herein for fabricating composite gas separation modules are economical and relatively simple to perform. By depositing preactivated powder and then depositing a binder metal onto the preactivated powder, smaller quantities of typically expensive solutions can be used. In addition, by practicing the methods described herein, thin (e.g., about 1 to about 3 micron) intermediate layers can be formed at or near the mouths of substrate pores. The intermediate layers at or near the mouths of substrate pores can reduce the effective pore size of the support and/or can provide a narrower support pore size distribution. In addition, during a gas separation operation, the composite gas separation modules described herein can avoid membrane blistering, delamination and/or cracking even when operating at high temperatures and/or for extended periods of time. The composite gas separation modules described herein can have relatively long term thermal stability at high temperatures (e.g., over 500° C.). The composite gas separation modules described herein can also have graded thermal expansion coefficients which can help prevent or reduce membrane cracking.

DETAILED DESCRIPTION OF THE INVENTION

The features and other details of the method of the invention will now be more particularly described with reference to the accompanying drawing and pointed out in the claims. It will be understood that the particular embodiments of the invention are shown by way of illustration and not as limitations of the invention. The principal features of this invention can be employed in various embodiments without departing from the scope of the invention.

The present invention relates to a composite gas separation module, comprising:
(a) a porous substrate; (b) an intermediate layer at the porous substrate that includes particles and a binder metal, wherein the binder metal is uniformly distributed throughout the intermediate layer; and (c) a dense gas-selective membrane, wherein the dense gas-selective membrane overlies the intermediate layer. The composite gas separation modules described herein typically have thinner dense gas-selective membranes than conventional composite gas separation modules. In addition, the composite gas separation modules described herein can have reduced occurrences of membrane cracking and/or reduced or eliminated intermetallic diffusion of substrate components into the dense gas-selective membrane, as compared to conventional composite gas separation modules.

The composite gas separation modules described herein include a dense gas-selective membrane such as, for example, a dense hydrogen-selective membrane. The dense hydrogen-selective membrane can include, for example, palladium or an alloy thereof. A "dense gas-selective membrane," as that term is used herein, refers to a component of a composite gas separation module that has one or more layers of a gas-selective material, i.e., a material that is selectively permeable to a gas, and that is not materially breached by regions or points which impair the separation of the gas by allowing the passage of an undesired gas. For instance, in one embodiment, the dense gas-selective membrane is not materially breached by regions or points which do not have the desired gas selectivity properties of the gas-selective material. An example of a dense gas-selective membrane is a dense hydrogen-selective membrane that is substantially free of defects such as open pores, holes, cracks and other physical conditions that impair the gas-selectivity of the composite gas separation module by allowing the passage of an undesired gas.

The term "support," as used herein, includes a substrate, a surface treated substrate, a substrate upon which a material (e.g., a gas-selective material) has been deposited, a substrate with an intermediate layer, or a subsequently plated substrate upon which a dense gas-selective membrane has been or will be formed. Serving as a support structure, the substrate can enhance the durability and strength of the composite gas separation module.

"Gas-selective material," as used herein, refers to those materials which, when formed into dense gas-selective membranes, allow the passage of a select gas, or select gases, through the dense gas-selective membrane. Suitable gas-selective materials include metals, ceramics (e.g., perovskite and perovskite-like materials) and zeolites (e.g., MFI and Zeolites A, X, etc.). In one embodiment, the gas-selective material is a hydrogen-selective metal such as palladium or an alloy thereof. Examples of suitable palladium alloys include palladium alloyed with at least one of the metals selected from the group consisting of copper, silver, gold, platinum, ruthenium, rhodium, yttrium, cerium and indium. For example, palladium/silver and palladium/copper alloys can be used to form dense hydrogen-selective membranes. In one embodiment, the gas-selective material is a ceramic such as oxygen gas-selective perovskite.

The side of the support upon which the dense gas-selective membrane is formed is referred to herein as the "outside" or "membrane-side" and the opposite side of the support is called the "inside" or "substrate-side" surface. However, it should be noted that the dense gas-selective membrane can be formed on the exterior surface and/or the interior surface of the substrate. For example, the dense gas-selective membrane can be formed on either or both surfaces of a planar substrate or can be formed on the exterior and/or interior surfaces of a substrate tube. Preferably, the dense gas-selective membrane is formed on only one surface of the substrate, for example, on either the exterior or the interior surface of a substrate tube.

In one embodiment, the gas-selective material can include a combination of substances, for example, a combination of a hydrogen-selective metal and a zeolite. In one embodiment, the zeolite used in a combination of substances is gas-selective. In an alternative embodiment, the zeolite used in a combination of substances is not gas-selective, for example, the zeolite used in a combination of substances is not hydrogen-selective.

Specific embodiments of the invention, including the composite gas separation modules, methods for fabricating the composite gas separation modules, a method for conditioning composite gas separation modules, and the method for selectively separating hydrogen gas from a hydrogen gas-containing gaseous stream follow. Details of optional components of the composite gas separation modules and method steps employed in various embodiments of methods for fabrication of the composite gas separation modules are described thereafter under separate subheadings.

The composite gas separation module includes an intermediate layer at a porous substrate. In one embodiment, for example, the intermediate layer has a top side and a bottom side and the intermediate layer is adjacent to the porous substrate on the bottom side and is adjacent to the dense gas-selective membrane on the top side. The intermediate layer can be a continuous or a discontinuous layer. In one embodiment, at least part of the intermediate layer is in pores of the porous substrate and/or covers pores of the porous substrate. In some embodiments, the intermediate layer is a discontinuous layer in the pores of the porous substrate, covering the pores of the substrate, and/or proximate to the pores of the substrate. Alternatively, the intermediate layer is a continuous layer that overlies the surface of the porous substrate including portions of the surface that do not contain pores.

The intermediate layer includes particles and a binder metal. The binder metal is uniformly distributed throughout the intermediate layer. The term "uniformly distributed," as used herein, refers to a uniform distribution of binder metal across the surface area of the particles of the intermediate layer. In one embodiment, the binder metal is a hydrogen-selective metal or an alloy thereof. "Hydrogen-selective metals" include, but are not limited to, niobium (Nb), tantalum (Ta), vanadium (V), palladium (Pd), platinum (Pt), zirconium (Zr) and hydrogen-selective alloys thereof. Palladium and alloys of palladium are preferred.

In some embodiments, the intermediate layer includes particles substantially uniform in size, e.g., of substantially uniform diameter. Alternatively, the intermediate layer can include particles of varying sizes and/or size distributions. The intermediate layer can include blends and/or layering of different particles including particles of differing sizes. The intermediate layer can include a gradient of particle size from a surface of the intermediate layer proximate to the porous substrate to a surface of the intermediate layer distal to the porous substrate. In one embodiment, particles having a smaller average size overlie particles having a larger average size. For example, particles having a larger average size are located proximate to the porous substrate (e.g., inside the pores of the porous substrate) and particles having a smaller average size are located distal to the porous substrate (e.g., inside the pores of the porous substrate but closer to the membrane-side surface of the porous substrate).

In one embodiment, the particles can have an average particle diameter of at least about 0.01 micron such as at least about 0.1, 0.5, 1, or at least about 5 microns. The particles can include particles capable of fitting into pores of the porous substrate. In some embodiments, the particles can have an average particle diameter of less than 5 microns such as less than 1, 0.5, 0.1, or less than 0.01 microns. In one embodiment, the particles have an average diameter ranging from about 0.01 to about 5 microns. For example, the particles can have an average diameter ranging from about 0.01 to about 3 microns or about 0.3 to about 1 micron.

In one embodiment, the intermediate layer includes sublayers of particles and binder metal, e.g., at least two sublayers of particles and binder metal. For example, the sublayers of particles and binder metal can include a first sublayer of a first population of particles and a first binder metal and a second sublayer of a second population of particles and a second binder metal, wherein the first population of particles has a larger average diameter than the average diameter of the second population of particles and wherein the second sublayer overlies the first sublayer. Thus, in one embodiment, the intermediate layer includes a sublayer of particles having a larger average diameter and an overlying sublayer of particles having a smaller average diameter. For example, the intermediate layer can include a sublayer of particles having an average diameter of about 0.3 to about 3 microns and an overlying sublayer of particles having an average diameter of about 0.1 to about 1 micron. Sublayers of particles and binder metal are not necessarily distinct sublayers. For example, the intermediate layer can include a gradient of particle sizes in a binder metal. In one embodiment, the intermediate layer includes a gradient of particle sizes ranging from generally larger particles at a point proximate to the porous substrate to generally smaller particles at a point distal to the porous substrate.

The particles of the intermediate layer can include metal particles, metal oxide particles, ceramic particles, zeolite particles, and combinations thereof, among others. For example, the particles can include such materials as tungsten, silver, copper oxide, aluminum oxide, zirconia, titania, silicon carbide, chromium oxide, and combinations thereof. Suitable metal oxide particles include, but are not limited to, aluminum oxide, titanium oxide, yttrium oxide, and chromium oxide. In some embodiments, the particles include aluminum oxide particles, e.g., alpha-alumina particles and/or gamma-alumina particles. The particles can include a blend or a layering of different particles including particles of differing compositions and/or sizes. The particles of the intermediate layer can have various morphologies and shapes. For example, the particles can be ordered or amorphous (e.g., crystalline). In one embodiment, the particles include spherical or mostly spherical particles.

In some embodiments, the particles can have a melting point temperature higher than the melting point temperature of the porous substrate, e.g., a porous metal substrate. The intermediate layer can include particles having a melting point temperature higher than the melting point temperature of the dense gas-selective membrane. For example, in one embodiment, the intermediate layer includes particles having a melting point temperature higher than both the melting point temperature of the porous metal substrate and the melting point temperature of the dense gas-selective membrane.

In one embodiment, the intermediate layer is at least about 0.01, 0.1, 1, 2, 3, 4, or at least about 5 microns thick. For example, the intermediate layer can range from about 0.01 to about 5 microns thick, such as from about 0.1 to about 3 or from about 1 to about 3 microns thick. In one embodiment, the intermediate layer is not significantly less porous to helium gas flux than the porous substrate. The intermediate layer can have an average pore size that is less than the average pore size of the porous substrate. In one embodiment, the largest pore of the intermediate layer is smaller than the largest pore of the porous substrate.

In another embodiment, the composite gas separation module can further include a layer of particles underlying the intermediate layer. In one particular embodiment, the composite gas separation module includes a layer of particles underlying the intermediate layer wherein a binder metal is not uniformly distributed throughout the layer of particles underlying the intermediate layer. For example, the binder material is not uniformly distributed across the surface area of this layer of particles underlying the intermediate layer. The layer of particles underlying the intermediate layer can include any of the particles described herein, e.g., aluminum oxide particles.

The composite gas separation module of the present invention includes a porous substrate, e.g., a porous metal substrate. The porous substrate can be formed from any of a variety of components known to those of ordinary skill in the art. Examples of suitable substrate components include, but are not limited to, iron, nickel, titanium, chromium, aluminum, and alloys thereof, e.g., steel, stainless steel, HASTELLOY® alloys (e.g., HASTELLOY® C-22®) (trademarks of Haynes International, Inc., Kokomo, Ind.) and INCONEL® alloys (e.g., INCONEL® alloy 625) (INCONEL is a trademark of Huntington Alloys Corp., Huntington W. Va.). In one embodiment, the porous substrate includes an alloy containing chromium and nickel (e.g., INCONEL® alloy 625). In an additional embodiment, the alloy contains chromium, nickel and molybdenum such as, for example, HASTELLOY® C-22® or INCONEL® alloy 625. The porous metal substrate can be porous stainless steel. Cylinders of porous stainless steel that are suitable for use as substrates are available from Mott Metallurgical Corporation (Farmington, Conn.) and from Pall Corporation (East Hills, N.Y.), for example.

One of ordinary skill in the art can select substrate thickness, porosity, and pore size distribution using techniques known in the art. Desired substrate thickness, porosity and pore size distribution can be selected based on, among other factors, the operating conditions of the final composite gas separation module such as operating pressure. Substrates having generally higher porosities and generally smaller pore sizes are particularly suited for producing composite gas separation modules. In some embodiments, the substrate can have a porosity in a range of about 5 to about 75% or about 15 to about 50%. While the pore size distribution of a substrate can vary, the substrate can have pore diameters that range from about 0.1 microns or less to about 15 microns or more. Generally, smaller pore sizes are preferred. However, in some embodiments, a substrate having larger pores is used and an intermediate layer having generally smaller pore sizes is formed at the porous substrate (e.g., a graded support is formed).

In some embodiments, the mean or median pore size of the substrate can range from about 0.1 to about 15 microns, e.g., from about 0.1 micron to about 1, 3, 5, 7 or about 10 microns. For example, the substrate can be an about 0.1 micron grade substrate to an about 0.5 micron grade substrate, e.g., 0.1 micron, 0.2 micron, and 0.5 micron grades of stainless steel substrates can be used. In one embodiment, the substrate is 0.1 micron grade HASTELLOY® alloy.

The composite gas separation module can further include a substrate surface treatment, as described infra. For example, a layer of a ceramic can be bonded to a porous metal substrate. The ceramic can include oxides, nitrides, and/or carbides, for example, iron oxide, iron nitride, iron carbide and/or aluminum oxide.

The composite gas separation module can also further comprise a layer of a metal selected from the group consisting of palladium, gold and platinum, wherein the layer of metal overlies the porous substrate and/or a substrate surface treatment. Such deposits of metal are discussed infra.

The composite gas separation module includes a dense gas-selective membrane, wherein the dense gas-selective membrane overlies the intermediate layer. In one embodiment, the dense gas-selective membrane is selectively permeable to hydrogen, e.g., the dense gas-selective membrane is a dense hydrogen-selective membrane and can include one or more hydrogen-selective metals or alloys thereof. As described above, hydrogen-selective metals include, but are not limited to, niobium (Nb), tantalum (Ta), vanadium (V), palladium (Pd), platinum (Pt), zirconium (Zr) and hydrogen-selective alloys thereof. Palladium and alloys of palladium are preferred. For example, palladium can be alloyed with at least one of the metals selected from the group consisting of copper, silver, gold, platinum, ruthenium, rhodium, yttrium, cerium and indium.

Where the gas separation module is to be used at temperatures below about 300° C., the dense gas-selective membrane can be formed of a palladium alloy such as, for example, an alloy of about 75 to about 77 weight percent palladium and about 25 to about 23 weight percent silver. An alloy is typically preferred at low temperatures because pure palladium can undergo a phase change in the presence of hydrogen at or below about 300° C. and this phase change can lead to embrittlement and cracking of the membrane after repeated cycling in the presence of hydrogen.

In one embodiment, the dense gas-separation membrane can include one or more non-metallic components. In an additional embodiment, the dense gas-separation membrane can include one or more components that are not gas-selective materials, e.g., components that are not hydrogen-selective materials.

In one embodiment, the thickness of the dense gas-selective membrane is less than about 3 times the diameter of the largest pore of the porous substrate. For example, the thickness of the dense gas-selective membrane can be less than about 2.5, 2, or less than about 1.5 times the diameter of the largest pore of the porous substrate. While the thickness of the dense gas-selective membrane can depend, among other factors, on the size of the largest pores in the porous substrate, in some embodiments the dense gas-selective membrane is less than about 25, 20, 15, 12 or less than about 10 microns in thickness. For example, in one embodiment, the thickness of the dense gas-selective membrane is less than about 14 microns such as about 3 to 14 microns. In one particular embodiment, the dense gas-selective membrane is of substantially uniform thickness.

In one aspect, performance of the composite gas separation modules described herein can be assessed by measuring hydrogen flux through the module during operation. For example, hydrogen flux through the composite gas separation modules, in some embodiments, is at least about 4, 10, 20, or at least about 30 $(m^3/m^2\text{-}hr)_{STP}$ at about 350° C. and with a hydrogen partial pressure difference of about 1 bar. In at least one embodiment, hydrogen flux through the composite gas separation module is at least about 33.6 $(m^3/m^2\text{-}hr)_{STP}$ at about 350° C. and with a hydrogen partial pressure difference of about 1 bar.

As an illustration of one embodiment of the present invention, FIG. 1A shows a partial cross-section of a composite gas separation module. Porous substrate 10 can include, for example, a porous metal substrate such as porous stainless steel. Intermediate layer 12 includes particles and a binder metal, wherein the binder metal is uniformly distributed throughout the intermediate layer. Intermediate layer 12 is shown in FIG. 1A as a continuous layer at porous substrate 10 but in other embodiments the intermediate layer is a discontinuous layer. Dense gas-selective membrane 14 overlies the intermediate layer.

Figure 1B:
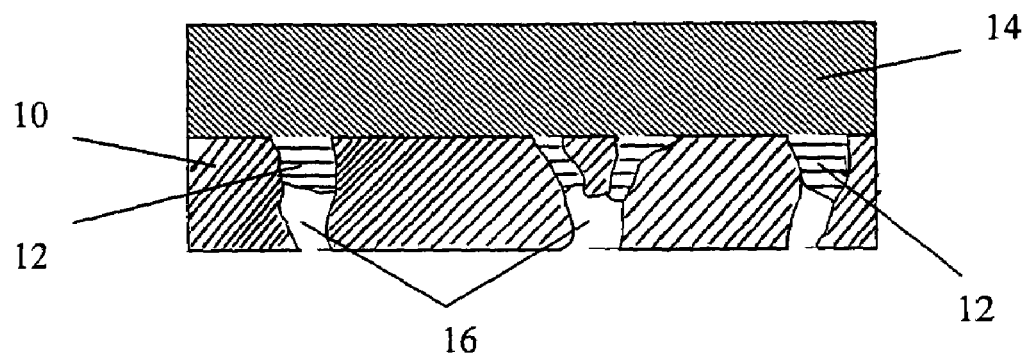

FIG. 1B shows a magnified partial cross-section of one embodiment of a composite gas separation module described by the present invention. Porous substrate 10 includes pores 16. Intermediate layer 12 includes particles and a binder metal, wherein the binder metal is uniformly distributed throughout the intermediate layer. Intermediate layer 12 is shown in FIG. 1B as a discontinuous layer at porous substrate 10 wherein intermediate layer is contained within pores 16, but in other embodiments the intermediate layer is a continuous layer. Dense gas-selective membrane 14 overlies intermediate layer 12.

Figure 1C:
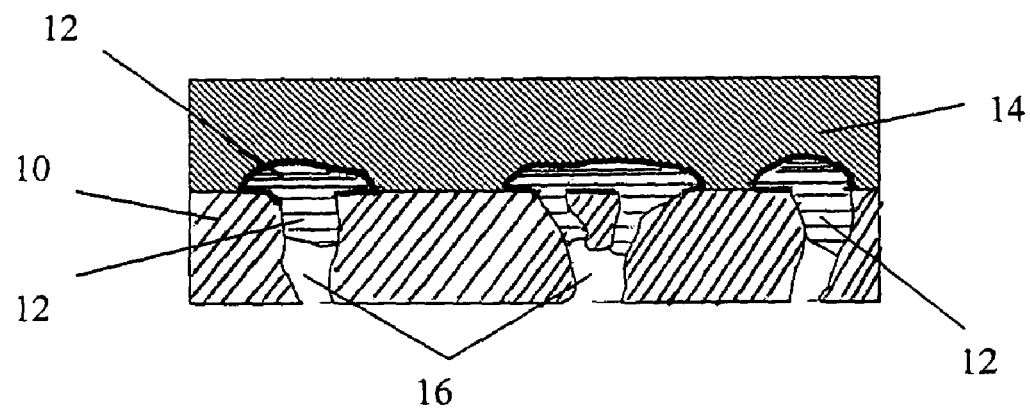

FIG. 1C shows a magnified partial cross-section of one embodiment of a composite gas separation module described by the present invention. Porous substrate 10 includes pores 16. Intermediate layer 12 includes particles and a binder metal, wherein the binder metal is uniformly distributed throughout the intermediate layer. Intermediate layer 12 is shown in FIG. 1C as a discontinuous layer at porous substrate 10 wherein the intermediate layer is both within and covering pores 16. In other embodiments, the intermediate layer is a continuous layer. In some embodiments, the intermediate layer only covers the pores of the porous substrate. Dense gas-selective membrane 14 overlies intermediate layer 12.

Figure 1D:
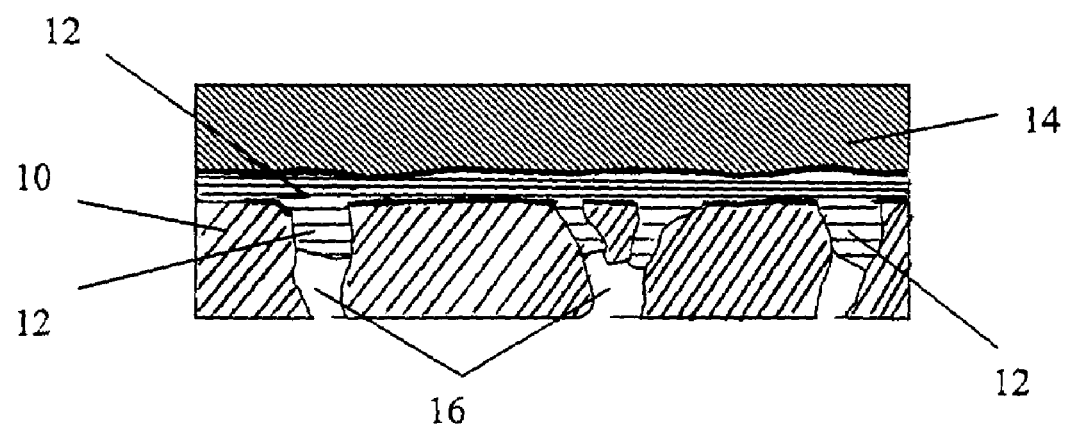

FIG. 1D shows a magnified partial cross-section of one embodiment of a composite gas separation module described by the present invention. Porous substrate 10 includes pores 16. Intermediate layer 12 includes particles and a binder metal, wherein the binder metal is uniformly distributed throughout the intermediate layer. Intermediate layer 12 is shown in FIG. 1D as a continuous layer at porous substrate 10 but in other embodiments the intermediate layer is a discontinuous layer. Dense gas-selective membrane 14 overlies the intermediate layer.

While FIGS. 1A to 1D illustrate planar cross-sections of composite gas separation modules, composite gas separation modules of the present invention can include planar and cylindrical composite gas separation modules such as those having flat porous substrates and tubular porous substrates. In addition, the composite gas separation modules illustrated in FIGS. 1A to 1D can also include a layer of particles (not illustrated) underlying intermediate layer 12 wherein a binder metal is not uniformly distributed throughout the layer of particles underlying the intermediate layer.

In one aspect, the invention includes a method for fabricating a composite gas separation module, comprising the steps of: (a) depositing a preactivated powder over a porous substrate; (b) depositing a binder metal onto the preactivated powder; and (c) depositing a dense gas-selective membrane to overlie the preactivated powder and binder metal, thereby forming the composite gas separation module. Suitable porous substrates, binder metals, and dense gas-selective membranes are described supra. A description of suitable fabrication techniques follow.

In a preferred fabrication method, any contaminants are initially cleaned from the substrate, for example, by treating the substrate with an alkaline solution such as by soaking the substrate in an approximately 60° C. ultrasonic bath for about half an hour. Cleaning is typically followed by rinsing such as, for example, wherein the substrate is sequentially rinsed with tap water, deionized water and isopropanol or wherein the substrate is sequentially washed with deionized water and acetone. Preparation of the porous substrate can also include surface treatment; formation of an intermetallic diffusion barrier such as by oxidizing the substrate, described infra; surface activation, described infra; and/or deposition of a metal such as palladium, gold or platinum, described infra, prior to depositing the preactivated powder over the porous substrate.

An intermediate layer is generally formed at the porous substrate prior to deposition of a dense gas-selective membrane (e.g., a hydrogen selective membrane). Generally, forming the herein-described intermediate layer includes depositing a preactivated powder over a porous substrate and depositing a binder metal onto the preactivated powder. An intermediate layer can be formed by depositing one or more sublayers that include powder and binder metal wherein at least one sublayer contains a preactivated powder. In some embodiments, one or more non-surface activated powders may be deposited over the porous substrate, over deposited preactivated powder, or over deposited preactivated powder and binder metal.

"Preactivated powder," as used herein, refers to a powder that has been surface activated by depositing metal nuclei on the surface of the powder. In one embodiment, the metal nuclei are nuclei of hydrogen-selective metals, e.g., palladium nuclei.

The method for fabricating a composite gas separation module includes the step of depositing a preactivated powder over a porous substrate. In one embodiment, depositing the preactivated powder over the porous substrate includes depositing the preactivated powder into the pores of the porous substrate. The preactivated powder can include preactivated metal powder, preactivated metal oxide powder, preactivated ceramic powder, preactivated zeolite powder, and combinations thereof, among others. For example, the preactivated powder can include preactivated tungsten, silver, copper oxide, aluminum oxide, zirconia, titania, silicon carbide, chromium oxide, and combinations thereof. Suitable preactivated metal oxide particles include, but are not limited to, preactivated aluminum oxide, preactivated titanium oxide, preactivated yttrium oxide, and preactivated chromium oxide. In some embodiments, the preactivated powder include preactivated aluminum oxide particles, e.g., preactivated alpha-alumina powder and/or preactivated gamma-alumina powder. The deposited powder can include a blend or a layering of different powders including powders of differing compositions and/or sizes. The powder can include particles of various morphologies and shapes. For example, the particles can be ordered (e.g., crystalline) or amorphous. In one embodiment, the powders include spherical or mostly spherical particles. In some embodiments, the powder can have a melting point temperature higher than the melting point temperature of the porous substrate, e.g., a porous metal substrate, and/or higher than the melting point temperature of the dense gas-selective membrane.

In one embodiment, the preactivated powder can have an average particle diameter of at least about 0.01 micron such as at least about 0.1, 0.5, 1, or at least about 5 microns. The preactivated powder can include particles capable of fitting into pores of the porous substrate. In some embodiments, the preactivated powder can have an average particle diameter of less than 5 microns such as less than 1, 0.5, 0.1, or less than 0.01 microns. In one embodiment, the preactivated powder has an average diameter ranging from about 0.01 to about 5 microns. For example, the particles can have an average diameter ranging from about 0.01 to about 3 microns or about 0.3 to about 1 micron.

In one embodiment, the present invention includes the further step of surface activating a powder to thereby form the preactivated powder. For example, surface activating the powder to form the preactivated powder can include seeding the powder with nuclei of a hydrogen-selective metal, e.g., palladium nuclei. In one embodiment, the powder is seeded with nuclei of a hydrogen-selective metal using an aqueous activation solution.

One technique for surface activating a powder to thereby form the preactivated powder includes placing the powder in an aqueous stannous chloride ($SnCl_2$) solution (e.g., 1 g/L, pH=2) for sensitization and filtering the powder from the solution shortly after. Then, the filter cake can be placed in an aqueous palladium chloride ($PdCl_2$) (e.g., 0.1 g/L, pH=2) activation solution. Shortly after, the resulting mixture can be filtered and washed to recover the preactivated powder.

Another technique for surface activating a powder to thereby form the preactivated powder includes placing the powder in an aqueous $SnCl_2$ solution (e.g., 1 g/L, pH=2). Shortly after, aqueous $PdCl_2$ solution (e.g., 0.1 g/L, pH=2) can be added. The resulting mixture can be filtered and washed to recover the preactivated powder.

The preactivated powder can be deposited using any of a number of techniques for applying a powder to a porous surface. For example, the preactivated powder can be deposited after transport to the support by a gas (e.g., a gas stream). In other embodiments, the powder particles are pressed and/or rubbed onto the support. In one embodiment, the preactivated powder is deposited from a slurry or suspension. For example, in one embodiment, the preactivated powder can be deposited from a liquid-based (e.g., water-based) slurry or suspension. In some embodiments, the preactivated powder can be deposited from a composition of several powders of varying compositions and/or particle size, e.g., from a slurry or suspension containing several different materials. For example, in one embodiment, a water-based slurry is prepared by mixing water with a preactivated powder selected from the group consisting of preactivated metal powders, preactivated metal oxide powders, preactivated ceramic powders, preactivated zeolite powders, and combinations thereof.

The slurry can contain, e.g., about 0.1 to about 30 g/L preactivated powder. For example, the slurry can contain about 0.1 to about 20, about 1 to about 15, about 1 to about 10, about 1 to about 5, or about 1 to about 3 g/L preactivated powder. For example, in one embodiment, the slurry can contain about 0.1 to about 10 g/L preactivated alumina powder such as about 1 to about 3 g/L preactivated alumina powder.

The preactivated powder can be deposited from a slurry or suspension by filtering the slurry or suspension through a porous support. For example, in one embodiment, the preactivated powder is deposited on a porous support as a filter cake after a slurry is filtered through the porous support. In some embodiments, a vacuum is applied to one side of a porous support and a slurry is applied to the opposite side of the porous support. Thus, a filter cake can accumulate on the side of the support to which the slurry is applied and filtrate can be collected on the side of the support to which the vacuum is applied. In one embodiment, a vacuum is applied to the tube side of a tubular support and a slurry is applied to the membrane side of the tubular support.

In some embodiments, the preactivated powder is deposited using a liquid-based composition such as a water-based slurry. Following deposition of the preactivated powder, the liquid-wetted preactivated powder can be dried. In other embodiments, the preactivated powder can be kept wet.

In one embodiment, the method further includes the step of exposing porous substrate anchoring sites following deposition of the preactivated powder over the porous substrate. Porous substrate anchoring sites include, for example, the tips of porous substrate constituent particles. Porous substrate anchoring sites can be exposed, for example, by mechanically treating the surface of the support. In one embodiment, porous substrate anchoring sites are exposed by brushing or abrading the surface following deposition of the preactivated powder over the porous substrate.

The method for fabricating a composite gas separation module includes the step of depositing a binder metal onto the preactivated powder. The binder metal can be deposited onto the preactivated powder, for example, by electrolessly plating the binder metal onto the preactivated powder. Without wishing to be held to any particular theory, it is believed that by depositing a binder metal (e.g., a hydrogen-selective metal or alloy thereof) onto the preactivated powder, the preactivated powder can be mechanically stabilized. It is thought that by depositing a binder metal onto a preactivated powder, a more uniform binder metal distribution results as compared to when a powder layer is applied to a support, the powder layer is surface activated, and then metal is deposited over the powder layer.

The inventive method can include depositing multiple successive layers of preactivated powder and binder metal over the porous substrate. In one embodiment, the method for fabricating a composite gas separation module includes the further steps of: (a) depositing an additional preactivated powder over the deposited preactivated powder and binder metal; and (b) depositing an additional binder metal onto the additional preactivated powder; wherein the dense gas-selective membrane is deposited to overlie the additional preactivated powder and the additional binder metal.

In one embodiment, the additional preactivated powder has an average particle size that is smaller than the average particle size of the preactivated powder (i.e., a prior deposited preactivated powder). For example, the preactivated powder can have an average particle diameter ranging, e.g., from about 0.3 to about 3 microns and the additional preactivated powder can have an average particle diameter ranging, e.g., from about 0.01 to about 1 micron. In some embodiments, the inventive method can include depositing multiple successive layers of powder and binder metal over the porous substrate wherein at least one of the successive layers contains a preactivated powder.

The present inventive method can also further include the step of depositing a powder over the porous substrate prior to depositing the preactivated powder. The powder deposited over the porous substrate can be preactivated or not preactivated. In one embodiment, this powder has an average particle size ranging from about 1 to about 5 microns. The powder can include any of the powders described herein, for example, aluminum oxide particles. This powder can be deposited using any of the techniques described herein for depositing a powder on a porous support, e.g., the powder can be deposited from a slurry.

After deposition of a preactivated powder over a porous substrate and deposition of a binder metal onto the preactivated powder, a dense gas-selective membrane is deposited to overlie the preactivated powder and binder metal. For example, a dense gas-selective membrane can be deposited by depositing a gas-selective metal, e.g., a hydrogen-selective metal, to overlie the preactivated powder and binder metal. In one embodiment, the method further includes the step of exposing porous substrate anchoring sites prior to applying the dense gas-selective membrane. Porous substrate anchoring sites include, for example, the tips of porous substrate constituent particles. Porous substrate anchoring sites can be exposed, for example, by mechanically treating the surface of the support. In one embodiment, porous substrate anchoring sites are exposed by brushing or abrading the surface of the support prior to depositing a dense gas-selective membrane.

In one embodiment, palladium or an alloy thereof is deposited, e.g., electrolessly plated, to overlie the preactivated powder and binder metal, thereby forming a dense gas-selective membrane. Application of the dense gas-selective membrane can include surface activating the preactivated powder and binder metal prior to depositing dense gas-selective membrane components. In some embodiments, a vacuum is applied to one side of a porous support and an activation composition is applied to the opposite side of the porous support. In one embodiment, a vacuum is applied to the tube side of a tubular support and an activation composition is applied to the membrane side of the tubular support.

Components of the dense gas-selective membrane, e.g., a hydrogen-selective metal or an alloy thereof, can be deposited to overlie the preactivated powder and binder metal using any of the techniques known in the art for depositing such materials on a support. For example, a component of the dense gas-selective membrane can be deposited on the support using electroless plating, thermal deposition, chemical vapor deposition, electroplating, spray deposition, sputter coating, e-beam evaporation, ion beam evaporation or spray pyrolysis. In some embodiments, a vacuum is applied to one side of a porous support and an plating composition, such as an electroless plating solution, is applied to the opposite side of the porous support. In one embodiment, a vacuum is applied to the tube side of a tubular support and a plating composition is applied to the membrane side of the tubular support.

An alloy of a gas-selective metal can be deposited over the deposited preactivated powder and binder metal as a component of the dense gas-selective membrane. In one embodiment, a palladium/silver alloy is formed by first depositing palladium onto the support by electroless deposition and then depositing silver, also by electroless deposition, onto the support. An alloy membrane layer can then be formed by heating the silver and palladium layers, for example, to about 500° C. to about 1000° C. in an inert or hydrogen atmosphere. In one embodiment, metal components can be co-deposited onto the support to form a layer of a finely divided mixture of small regions of the pure metal components. In another embodiment, a technique such as sputtering or chemical vapor deposition is used to simultaneously deposit two or more metals to form an alloy layer on the support.

In one embodiment, the present inventive method can further include the step of depositing a gas-selective material to overlie the preactivated powder and binder metal, thereby forming a coated substrate and abrading the surface of the coated substrate, thereby forming a polished substrate, prior to formation of the dense gas-selective membrane (e.g., a dense hydrogen-selective membrane) over the intermediate layer. Abrasion of a deposited material is further described infra.

The present invention also includes the further step of treating the composite gas-separation module with hydrogen gas at a temperature of up to about 250° C. In one embodiment, the pressure of the hydrogen gas can range up to about 8 bar. Typically, the treatment with hydrogen gas lasts for at least about 1 hour, for example, about 1 hour to about 4 hours or about 3 to about 4 hours. Without wishing to be held to any particular theory, it is believed that by exposing newly formed palladium-containing membranes to hydrogen at a low temperature (e.g., up to about 250° C. such as about 200° C. to about 250° C.) and at a low pressure (e.g., up to about 8 bar such as up to about 2 or 3 bar), palladium grain growth is slowed and membrane cracking is slowed or prevented. It is believed that suitable hydrogen temperatures and pressures for this treatment are those that lie outside the two phase region on a palladium-hydrogen phase diagram.

The present invention also includes a method for conditioning a composite gas separation module. The method comprises the step of treating a composite gas separation module with hydrogen gas at a temperature of up to about 250° C. The composite gas separation module can have been formed using any technique known in the art. In one embodiment, the composite gas separation module is formed as described herein. Preferably, the composite gas separation module includes palladium or an alloy thereof.

In one embodiment, the temperature of the hydrogen gas is at least about 200° C. The pressure of the hydrogen gas can range up to about 8 bar. For example, the pressure of the hydrogen gas can be in the range from about 2 to about 3 bar. The composite gas-separation module can be treated with hydrogen gas, for example, for at least about 1 hour such as about 1 hour to about 4 hours or about 3 to about 4 hours. As described supra, it is believed that by exposing newly formed palladium-containing membranes to hydrogen at a low temperature (e.g., up to about 250° C. such as about 200° C. to about 250° C.) and at a low pressure (e.g., up to about 8 bar such as up to about 2 or 3 bar), palladium grain growth is slowed and membrane cracking is slowed or prevented. It is believed that suitable hydrogen temperatures and pressures for this treatment are those that lie outside the two phase region on a palladium-hydrogen phase diagram. The present invention also includes composite gas separation modules conditioned by practicing the above-described method.

In one aspect, the present invention includes a method for selectively separating hydrogen gas from a hydrogen gas-containing gaseous stream, by which method, hydrogen gas is at least partially partitioned from the gaseous stream by passing through a dense hydrogen-selective membrane. The method includes directing the hydrogen gas-containing gaseous stream to a composite gas separation module, wherein the composite gas separation module includes: (a) a porous substrate; (b) an intermediate layer at the porous substrate that includes particles and a binder metal, wherein the binder metal is uniformly distributed throughout the intermediate layer; and (c) a dense hydrogen-selective membrane, wherein the dense hydrogen-selective membrane overlies the intermediate layer. In one embodiment, a layer of a ceramic can be bonded to the porous substrate. The intermediate layer can be formed using any of the techniques described herein. Preferably, the dense hydrogen-selective membrane includes palladium or an alloy thereof.

When the composite gas separation module is exposed to a hydrogen gas-containing atmosphere (e.g., a gaseous stream), the dense hydrogen-selective membrane can cause the hydrogen gas to dissociate and diffuse through the membrane. As a result, hydrogen is selectively removed from the hydrogen gas-containing gaseous stream into a volume on the opposite side of the gas separation module. A pressure gradient of hydrogen, wherein the hydrogen partial pressure of the hydrogen gas-containing gaseous stream is greater than the hydrogen partial pressure on the opposite side of the gas separation module, can be maintained to increase the flux of hydrogen through the dense hydrogen-selective membrane of the composite gas separation module.

Specific applications for which the composite gas separation module is well-suited include, but are not limited to, hydrogenation/dehydrogenation reactions, methane/steam reforming reactions, and other steam reforming reactions or autothermal reforming of methane. In one embodiment, the present invention includes the step of reacting hydrogen gas-producing reactants to produce the gaseous stream from which hydrogen gas is at least partially partitioned.

In dehydrogenation reactions, the reaction products include hydrogen gas. Reactants, at least one of which includes molecularly-bound hydrogen, can be placed surrounding, between or within composite gas separation modules as described herein. As the reaction proceeds, hydrogen gas can be removed by the composite gas separation module from the volume wherein the reactants react. Since these reactions are generally thermodynamic equilibrium controlled, the reaction can be limited by the accumulation of hydrogen gas and the reaction reaches equilibrium when a sufficient quantity of hydrogen has accumulated. When hydrogen is separated from the reactants, however, conversion can reach 95% or more. In a methane/steam reforming, methane and steam can be passed through or around a tubular composite gas separation module in the presence of a catalyst. The methane and steam react to produce carbon dioxide and hydrogen, and the hydrogen can be dissociated through the dense hydrogen-selective membrane and thereby separated from the other gases.

Details of specific method steps that can be employed in various embodiments of the invention follow under separate subheadings.

Substrate Surface Treatments

The present method for fabricating a composite gas separation module can also include surface treating the porous substrate prior to depositing the preactivated powder over the porous substrate. For example, the present method for forming a composite gas separation module can also include forming an intermetallic diffusion barrier on the porous substrate prior to depositing the preactivated powder over the porous substrate. In one embodiment, forming an intermetallic diffusion barrier (e.g., an oxide layer intermetallic diffusion barrier) includes oxidizing the substrate in situ.

The method can include the step of forming a ceramic coating on the surface of the porous substrate prior to applying a preactivated powder over a porous metal substrate. In one embodiment, a metal present at the surface of a porous metal substrate is oxidized. Thus, the metal present at the substrate surface is in an oxidized state, bonded to the substrate. In another embodiment, a material is deposited on the surface of the porous substrate and is subsequently oxidized prior to applying the preactivated powder over the porous substrate. In other embodiments, a nitride layer can be formed on the surface of a porous metal substrate (prior to depositing the preactivated powder over the porous substrate), for example, by oxidizing the substrate in an ammonia-bearing or nitrogen-based atmosphere or a carbide layer can be formed, for example, by oxidizing a porous metal substrate in an atmosphere comprising hydrocarbon gases. To enhance the stability of the composite gas separation module, particularly where it will be used at high temperatures, the substrate can be further coated with a second protective layer, such as with a layer of alumina, silica, mullite, cordierite, zirconia, titania, tantalum oxide, tungsten or magnesium oxide.

Composite gas separation modules having a surface treated substrate and methods for surface treating a substrate are described in U.S. Pat. No. 6,152,987 issued on Nov. 28, 2000, to Ma, et al., the entire contents of which is incorporated herein by reference.

Additional Intermetallic Diffusion Barrier

The inventive methods described herein can also include forming an additional intermetallic diffusion barrier on the porous substrate prior to or following depositing the preactivated powder and binder metal over the porous substrate. In one embodiment, forming an intermetallic diffusion barrier (e.g., an oxide layer intermetallic diffusion barrier) includes oxidizing the substrate in situ as described under the heading Substrate Surface Treatments, supra. In another embodiment, an additional intermetallic diffusion barrier includes one or more layers of deposited metal. For example, applying a porous metal layer intermetallic diffusion barrier can include applying one or more porous layers of metal over the surface of the porous substrate.

In one embodiment, a porous metal layer intermetallic diffusion barrier includes palladium or an alloy thereof and a Group IB metal, such as copper or silver, or an alloy thereof. For example, the intermetallic diffusion barrier can include alternating porous layers of palladium and a Group IB metal or alloys thereof. Methods for fabricating composite gas separation modules that include intermetallic diffusion barriers are further discussed in U.S. Provisional Patent Application No. 60/457,061, entitled "Method of Making Intermetallic Diffusion Barrier," by Ma, et al., filed on Mar. 21, 2003, and in U.S. patent application Ser. No. 10/804,846, entitled "Composite Gas Separation Modules Having Intermediate Porous Metal Layers," by Ma, et al., each incorporated by reference herein in their entirety.

Metal Deposition on the Porous Substrate

The present inventive methods for forming a composite gas separation module can also include depositing a metal selected from the group consisting of palladium, gold and platinum on the porous substrate prior to depositing the preactivated powder over the porous substrate. Preferably, this deposit of metal on the porous substrate does not significantly increase the transport resistance of the substrate. In one embodiment, the thickness of this metal deposit is less than about 10, 7, 5, 3, or less than about 1 percent of the ultimate thickness of the dense gas-selective membrane.

This procedure can include surface activating the porous substrate, as described infra, prior to depositing the metal on the porous substrate. This process of depositing a metal selected from the group consisting of palladium, gold and platinum on the porous substrate can help protect the substrate from post-synthesis corrosion. In one embodiment, the deposition of palladium, gold and/or platinum on the porous substrate is made following formation of an intermetallic diffusion barrier such as an oxide layer intermetallic diffusion barrier, described supra.

In one embodiment, a small quantity of the metal, sufficient to cover the pore walls of the substrate, is deposited on the porous substrate without a significant reduction of the substrate porosity. Typically, the deposition of palladium, gold and/or platinum on the porous substrate is made by surface activating and plating on the side of the substrate opposite to the side on which a gas-selective membrane will be formed. For example, in one embodiment, a deposit of palladium, gold and/or platinum is formed from the inside of a substrate tube (e.g., using an electroless plating solution) and a dense gas-selective membrane is subsequently formed on the outside of the substrate tube.

Surface Activation

The present method for forming a composite gas separation module can include surface activating a support prior to deposition of a desired material (e.g., a binder metal, components of the dense gas-selective membrane or a metal deposited on the porous substrate). For example, a porous substrate can be surface activated prior to depositing a hydrogen-selective metal or alloy thereof on the support. In one embodiment, the surface of the preactivated powder and binder metal is surface activated prior to applying a dense gas-selective membrane to overlie the preactivated powder and binder metal. In addition, applying a dense gas-selective membrane to overlie the preactivated powder and binder metal can include surface activating the support between applications of components of the dense gas-selective membrane.

In one embodiment, surface activation includes seeding the surface of the support with nuclei of a hydrogen-selective metal such as with palladium nuclei. Without wishing to be held to any particular theory, it is believed that when a surface activated support is electrolessly plated, the palladium nuclei on the surface activated substrate initiate, in the presence of a reducing agent such as hydrazine, an autocatalytic process of reducing a metastable palladium salt complex on the surface.

In one embodiment, the support is surface activated by treating it with liquid activation compositions such as, for example, aqueous stannous chloride ($SnCl_2$) and palladium chloride ($PdCl_2$). In one embodiment, the support is surface activated to seed substantially all of the surfaces of the support with nuclei of a hydrogen-selective metal, e.g., palladium. For example, the support can be surface activated by first immersing it in an aqueous acidic $SnCl_2$ bath (e.g., an about 1 g/L aqueous $SnCl_2$ bath) for a suitable time, such as about five minutes, to sensitize the support. Then, the support can be immersed for a suitable time, such as about five minutes, in an aqueous acidic $PdCl_2$ bath (e.g., an about 0.1 g/L aqueous $PdCl_2$ bath) to seed the support with palladium nuclei. The temperature of each bath is typically about 15° C. to about 25° C., for example, about 20° C. Ordinarily, after each immersion in the $SnCl_2$ bath, the support is rinsed with water, for example, deionized water. Typically, after each immersion in the $PdCl_2$ bath, the support is rinsed first with hydrochloric acid, preferably dilute hydrochloric acid, for example, 0.01 M hydrochloric acid, and then with water. Rinsing with hydrochloric acid can be used to prevent hydrolysis of the palladium ions.

During rinsing, after immersion of the support in the acidic stannous chloride bath, stannous ions on the surface of the support can be partially hydrolyzed to form relatively-insoluble products, for example, $Sn(OH)_{1.5}Cl_{0.5}$ and other more complicated hydroxyl-chlorides. The products of hydrolysis can be strongly attached to the surface as a layer having a thickness on the order of a few angstroms. The composition, structure and thickness of this layer can depend on factors such as the ratio of hydrochloride to stannous chloride; the structure, roughness and shape of the support surface; and the hydrodynamic regime of rinsing. This layer is thought to reduce the $Pd^{2+}$ ions from the $PdCl_2$ bath to $Pd^0$ to form the nuclei or seeds on the surface of the support.

Generally, the above-described process of treating the support with $SnCl_2$ and then with $PdCl_2$ is repeated as necessary to provide a surface activated support. The exact number of repetitions of treatment with $SnCl_2$ and then with $PdCl_2$ depends on the intensity of surface activation that is desired. Typically, the treatment with $SnCl_2$ and then with $PdCl_2$ is preformed at least one time such as about 2 to about 10 times or, preferably, about 2 to about 5 times. In one preferred embodiment, the surface activated support has a uniform dark-brown color and a smooth surface.

Thus, the surface activated support can include a structure having a number of thin layers of palladium nuclei, each formed after performing a surface activation process (such as by treating the support with $SnCl_2$ and then with $PdCl_2$). These preseeded palladium nuclei can reduce the induction period of the autocatalytic process at the start of electroless palladium plating.

While the surface activation of a support using palladium nuclei has been illustrated above, methods for forming surface activated supports suitable for the plating of other metals are well-known to those of ordinary skill in the art.

Alternatively, a metal or alloy (e.g., palladium or alloy thereof) can be deposited on a support without surface activation of the support. However, absent surface activation, plating of the support with the metal can be slow.

Metal Deposition

Deposition of a material on a support can include plating the support with a metal (e.g., a hydrogen-selective metal). For example, depositing a metal on a support, such as depositing metal on the porous substrate, applying a porous metal layer intermetallic diffusion barrier and/or applying the dense gas-selective membrane can employ an electroless plating technique such as the method that follows.

In one embodiment, plating is conducted by electroless plating. For example, palladium deposition can occur according to the autocatalytic reactions of Chemical Equations I and II:

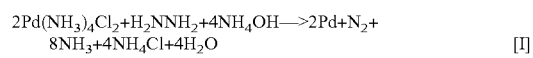

[I]

or

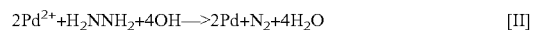

[II]

In one embodiment, a plating solution is prepared that contains the following: 4.0 g/L $Pd(NH_3)_4Cl_2 \cdot H_2O$; 198 mL/L $NH_4OH$ (28%); 40.1 g/L $Na_2EDTA$; and 5.6-7.6 mL/L $H_2NNH_2$ (1 M). This plating solution can be maintained at a temperature from about 20° C. to about 90° C. such as, for example, about 60° C. Typically, the plating solution has a pH of approximately 10.4 and is provided in a quantity sufficient to provide approximately 3.5 $cm^3$ of solution per square centimeter of plating area.

The plating solution can be contained in a plating vessel which can be jacketed to provide temperature control. For example, the plating vessel can be kept in a temperature controlled water bath. The support is typically introduced to the plating solution to begin deposition of the palladium.

After about one hour of steady-state deposition of palladium onto the support, the plating activity decreases with a depletion of palladium ions and hydrazine ($H_2NNH_2$) and a decrease in the pH of the plating solution. After depletion of the plating solution, a new solution can be provided and the procedure repeated. A stable high rate of deposition for each plating can be achieved not only by changing the plating solution, but also by carefully rinsing the deposited metal between platings. Typically, the deposited metal is rinsed a minimum of about five times, e.g., with deionized water at about 50° C. to about 60° C. for about 2 to about 5 minutes.

As alternatives to electroless plating, a material, e.g., palladium, can be deposited on the support by other suitable metal deposition techniques known in the art, such as thermal deposition, chemical vapor deposition, electroplating, spray deposition, sputter coating, e-beam evaporation, ion beam evaporation or spray pyrolysis.

Selective Plating

In one embodiment, the present invention can further include selectively surface activating a support proximate to a defect and preferentially depositing a material on the selectively surface activated portion of the support. For example, a support can be selectively plated with a hydrogen-selective metal (or an alloy thereof) following deposition of the preactivated powder and binder metal. In one embodiment, applying a dense hydrogen-selective membrane to overlie the preactivated powder and binder metal can include selectively plating the support with a hydrogen-selective metal or an alloy thereof.

Methods for fabricating gas separation modules that include selectively surface activating a support proximate to a defect and preferentially depositing a material on the selectively surface activated portion of the support are discussed in U.S. Provisional Patent Application No. 60/456,931, entitled "Method of Producing Thin Palladium and Palladium Alloy Layers," by Ma, et al., filed on Mar. 21, 2003, and in U.S. patent application Ser. No. 10/804,848, "Method for Curing Defects in the Fabrication of a Composite Gas Separation Module," by Ma, et al., each incorporated by reference herein in their entirety.

Abrasion of a Deposited Material

In one embodiment, the present invention includes the further step of abrading a deposited material. For example, in one embodiment, a material, such as a gas-selective material, is applied over an intermediate layer prior to depositing the dense gas-selective membrane, and the product can then be abraded prior to depositing the dense gas-selective membrane. In another embodiment, a first component of the dense gas-selective membrane can be deposited to over an intermediate layer, the deposited first component can be abraded, and a second component of the dense gas-selective membrane can be applied over the abraded, deposited first component.

Abrasion of a deposited material can help to reduce or prevent the repetition of an intermediate layer's possible porous morphology in subsequent applications of materials, e.g., gas-selective materials such as hydrogen-selective metal or an alloy thereof. In one embodiment, an intermediate layer is formed over the porous substrate; the intermediate layer is abraded, thereby forming a polished intermediate layer; and a gas-selective material is deposited on the polished intermediate layer.

Methods for fabricating composite gas separation modules that include abrading a deposited material are further discussed in U.S. Provisional Patent Application No. 60/456,930, entitled "Method for Producing Dense Selective Layers," by Ma, et al., filed on Mar. 21, 2003, and in U.S. patent application Ser. No. 10/804,847, "Method for Fabricating Composite Gas Separation Modules," by Ma, et al., each incorporated by reference herein in their entirety.

Reacting Chloride to Form Phosphate

A surface activated support, the dense gas-selective membrane, or other intermediate products described herein can contain chloride anions. Residual metal chlorides, resulting from surface activation or electroless plating steps, can remain in the pores of the support. In one embodiment, the invention includes removing residual metal chlorides, for example, by treatment with an aqueous phosphoric acid solution, e.g., 10% phosphoric acid solution. For example, the treatment can include application of 10% phosphoric acid solution at room temperature for a time sufficient to convert residual metal chlorides to metal phosphates, e.g., about 30 minutes, followed by appropriate rinsing and drying, e.g., rinsing with deionized water for about 30 minutes and drying at about 120° C. for at least about 2 hours.

Therefore, the present method for forming a composite gas separation module can include the further step of reacting chloride anions to form metal phosphates. For example, residual metal chlorides can be removed between depositions of dense gas-selective membrane components. Treatment with an aqueous phosphoric acid solution can promote exchange of chloride anions to form insoluble metal phosphates. The removal of metal chlorides from the pores can reduce or substantially eliminate corrosion of the support during subsequent plating steps and post-synthesis. In addition, the formed metal phosphates can be more stable than metal chlorides in a dense hydrogen-selective membrane at high temperatures. This method can retard the formation of metal chlorides in the support as well as retard the formation of metal chlorides used in electroless plating solutions and activation compositions.

Composite gas separation modules and methods for their fabrication suitable for use in conjunction with the present invention are described in U.S. Pat. No. 6,152,987, cited supra, and also in U.S. Provisional Patent Application No. 60/456,931, cited supra; U.S. Provisional Patent Application No. 60/457,061, entitled "Method of Making Intermetallic Diffusion Barrier," by Ma, et al., filed on Mar. 21, 2003; U.S. Provisional Patent Application No. 60/456,930, cited supra; U.S. Provisional Patent Application No. 60/467,493, entitled "High Melting Point Metal Diffusion Barriers for Composite Palladium Porous Stainless Steel Membranes," by Ma, et al., filed on May 2, 2003; U.S. patent application Ser. No. 10/836,088, entitled "Composite Gas Separation Modules Having High Tamman Temperature Intermediate Layers," by Ma, et al., filed on Apr. 30, 2004; U.S. patent application Ser. No. 10/804,848, entitled "Method for Curing Defects in the Fabrication of a Composite Gas Separation Module," by Ma, et al., cited supra; and U.S. patent application Ser. No. 10/804,847 entitled "Method for Fabricating Composite Gas Separation Modules," by Ma, et al., cited supra, each of which is incorporated herein by reference in its entirety.

EXEMPLIFICATION

The invention will now be further and specifically described by the following examples which are not intended to be limiting.

Example 1

This example describes the fabrication of a composite structure having a dense hydrogen-selective membrane, an intermediate layer that included a preactivated aluminum oxide ($Al_2O_3$) powder and a palladium binder, and a nominal 0.1 media grade porous 316L stainless steel ("PSS") support.

A 2.5 inch (6.35 centimeter (cm)) long, 0.5 inch (1.27 cm) outside diameter (O.D.) section of PSS tube, welded to a section of non-porous 316L stainless steel tube on one end and a non-porous cap on the other end, was obtained from Mott Metallurgical Corporation. Contaminants were removed by cleaning the tube in an ultrasonic bath with alkaline solution at 60° C. for one hour. Tap water was flushed on both the inside and the outside of the tube for 5 hours to remove all the alkaline solution from the PSS pore system. The tube was then washed with distilled water 2 or 3 times in an ultrasonic bath (10 minutes each wash). Finally, the tube was rinsed with acetone for 10 minutes. The support was then dried at 120° C. overnight. The tube was then oxidized in air at 500° C. for 10 hours. After oxidation, the color of the porous substrate had changed from silver to gray-green and did not appear uniform. A second oxidation at 500° C. for 10 hours was performed and the color of the support changed from gray-green to red and uniform.

Preactivated aluminum oxide (alumina) powder was formed by surface activating aluminum oxide powder using the following method. 5 grams (g) of $Al_2O_3$ powder with an average particle size of 5 microns (Buehler, Ltd., Lake Bluff, Ill.), 2.5 g of $Al_2O_3$ powder with a mean particle size of 3 microns (Buehler, Ltd.) and 1 g of $Al_2O_3$ powder with a mean particle size of 0.01-0.02 microns (Alfa Aesar; Ward Hill, Mass.) were cleaned in 200 milliliters (mL) of water solution with pH adjusted to 2 using 10 M HCl. The cleaning step was performed in an ultrasonic bath at 60° C. for 1 hour. The cleaned alumina powder mixture was filtered using glass microfiber filter paper (WHATMAN® GF/F type, Whatman, Inc; Clifton, N.J.) and an aspirator. The filter cake with the glass microfiber filter was then put in 200 mL of aqueous stannous chloride ($SnCl_2$) solution (1 g/L, pH=2) for sensitization. The sensitizing step was performed in an ultrasonic bath at 60° C. for 10 minutes. The GF/F filter was removed from the solution using a glass rod and the sensitized powder mixture was filtered. The filter cake with the glass microfiber filter was placed in 200 mL aqueous palladium chloride ($PdCl_2$) (0.1 g/L, pH=2) activation solution. The activation step was performed in an ultrasonic bath at 60° C. for 10 minutes. Finally, the activated powder mixture was filtered, washed with distilled water, and dried overnight at 120° C. At the end of the activation procedure, a thin yellowish cake of preactivated aluminum oxide was formed on the glass microfiber filter.

0.5 g of the pre-activated mixture was mixed in 200 ml of water at pH 2 to form a slurry which was placed in ultrasonic bath for homogenization. The oxidized support was then placed in the slurry and a vacuum was pulled (using an aspirator) from the inside of the tube. After 30 seconds, a gray deposit formed on the porous section of the support.

Palladium adhesion to the support was increased by the presence of anchoring sites. Anchoring sites, such as the tips of the substrate particles (e.g., the tips of PSS grains forming the PSS support), were not covered by the alumina powder to produce good adhesion between the palladium membrane and the support. To expose the anchoring sites, extra alumina cake was removed by gloved hand while gently rinsing with distilled water. The vacuum in the tube side was maintained during removal of the extra alumina. Alumina remained inside the pore mouths of the porous support.

The support was then palladium plated for 20-30 minutes while applying a vacuum to the tube side using the following procedure. The tube was immersed in a plating solution at room temperature. The plating solution was composed of 4 grams $Pd(NH_3)_4Cl_2H_2O$/liter, 198 milliliters $NH_4OH$ (28 weight percent)/liter, 40.1 grams $Na_2EDTA$/liter, and 6 milliliters aqueous $H_2NNH_2$ (1 M)/liter. The plating solution and tube were placed in a water bath at 60° C. During plating, the level of plating solution was kept constant by adding a small quantity of plating solution for loss of solution to the vacuum. After the palladium in the plating solution was depleted, the tube was removed and placed in deionized water at 60° C. until the water temperature reached room temperature. The tube was rinsed with cold water 4 to 5 times. Then, the support was dried at 120° C. overnight.

After the powder deposition, the support was surface activated by sequentially immersing the exterior of the support in aqueous baths of $SnCl_2$ and $PdCl_2$. The exterior of the tube was immersed in 140 mL of aqueous $SnCl_2$ (1 g/L) at 20° C. for about 5 minutes and was subsequently rinsed with deionized water. The exterior of the tube was then immersed in 140 mL of aqueous $PdCl_2$ (0.1 g/L) at 20° C. for about 5 minutes followed by rinsing first with 0.01 molar hydrochloric acid and then with deionized water. The above-described surface activation cycle was performed a total of three times.

The surface activated support was then plated with palladium for 3 hours (2 cycles of palladium plating, as described above). After the first cycle of palladium plating, a slight mechanical treatment was preformed on the palladium layer with 600 grit silicon carbide paper to smooth the palladium layer. A dense palladium film, 14.8 microns thick (determined gravimetrically), was achieved after a total plating time of 9 hours. This composite palladium membrane showed a hydrogen permeance of 22.7 $[m^3/(m^2 \text{ hour bar}^{0.5})]_{STP}$ at 500° C. The hydrogen permeance was stable during the total time of the experiment (70 hours) at 500° C. The selectivity ($H_2$/He) of this membrane at 500° C. was 260.

Example 2

This example describes the fabrication of a composite structure having a dense hydrogen-selective membrane, an intermediate layer that included preactivated aluminum oxide ($Al_2O_3$) powders and a palladium binder, and a nominal 0.1 media grade porous 316L stainless steel ("PSS") support.

A 2.5 inch (6.35 cm) long, 0.5 inch (1.27 cm) O.D. section of PSS tube, welded to a section of non-porous 316L stainless steel tube on one end and a non-porous cap on the other end, was obtained from Mott Metallurgical Corporation. The support was cleaned and dried following the same procedure described in Example 1. The support was then oxidized at 500° C. in air for 10 hours.

Three different mixtures of powders were prepared as described below.

Powder Mixture 1 included 65 wt % $Al_2O_3$ with an average particle size of 1 micron (Alfa Aesar); 30 wt % $Al_2O_3$ with an average particle size of 5 microns (Buehler, Ltd.), and 5 wt % $Al_2O_3$ with an average particle size of 3 microns (Buehler, Ltd.).

Powder Mixture 2 included 60 wt % $Al_2O_3$ with an average particle size of 0.3 micron (Alfa Aesar); 30 wt % $Al_2O_3$ with an average particle size of 3 microns (Buehler, Ltd.), and 10 wt % $Al_2O_3$ with an average particle size of 1 micron (Alfa Aesar).

Powder Mixture 3 included 60 wt % $Al_2O_3$ with an average particle size of 0.01-0.02 micron (Alfa Aesar); 30 wt % $Al_2O_3$ with an average particle size of 1 micron (Alfa Aesar), and 10 wt % $Al_2O_3$ with an average particle size of 0.3 micron (Alfa Aesar).

The fine and very fine mixtures of alumina powders (i.e., Powder Mixtures 2 and 3) were activated separately following the procedure described in Example 1. The coarse powder (i.e., Powder Mixture 1) was not activated to avoid subsequent deposition of palladium too deep into the pore system of the PSS support.

The oxidized PSS support was placed for 1 minute in a 200 mL water slurry at pH 2 that contained 0.5 g of Powder Mixture 1. A vacuum was applied to the tube side of the support and an alumina cake easily formed on the support. Extra alumina cake was removed by gloved hand while gently rinsing with distilled water while vacuum on the tube side was maintained. Alumina powder only remained in the pore mouths of the support. Following the deposition of Powder Mixture 1, the support was immersed for 1 minute in a 200 mL water slurry that contained 0.5 g of pre-activated Powder Mixture 2 while a vacuum was applied to the tube side of the support. Again, extra alumina cake was removed carefully by gloved hand as described above. After deposition of the pre-activated Powder Mixture 2, the support was placed in 140 mL of palladium plating solution (described in Example 1) for 5 minutes of palladium plating (with no vacuum applied to the tube side) to glue the alumina particles. Following deposition of Powder Mixture 2, the support was immersed in a 200 mL water slurry that contained 0.5 g of pre-activated Powder Mixture 3 for 1 minute while a vacuum was applied to the tube side of the support. Again, extra alumina cake was removed carefully by gloved hand. After deposition of preactivated Powder Mixture 3, the support was immersed in 140 mL of palladium plating solution for 5 minutes of palladium plating (with no vacuum applied to the tube side). This process produced a graded support.

The graded support was then surface activated by performing two times the surface activation cycle described in Example 1. The surface activated support was then plated with palladium for 3 hours (2 cycles of palladium plating, as described in Example 1 with no vacuum applied). After the first cycle of palladium plating a slight mechanical treatment was preformed on the palladium layer with 600 grit silicon carbide paper to smooth the palladium layer. After the first two palladium plating cycles, the support was surface activated using one cycle without a vacuum applied and then two surface activation cycles with a vacuum applied to the tube side of the support. Following surface activation, palladium was plated for 3 hours while pulling a vacuum on the tube side of the support. The support was then surface activated again using 3 surface activation cycles and then plated with palladium for an additional 3 hours, both steps performed without vacuum. After a total plating time of 9 hours, the membrane was 14 microns thick (determined gravimetrically).

The permeance of this membrane reached 16 $[m^3/(m^2 \text{ hour bar}^{0.5})]_{STP}$ after 50 hours at 250° C., which was extremely high compared to the membrane of Example 1. The selectivity of this membrane at 250° C. was measured to be 84. The low selectivity was likely due to an imperfection in the PSS support that could not be covered by palladium.

Example 3

This example describes the fabrication of a composite structure having a dense hydrogen-selective membrane, an intermediate layer that included preactivated aluminum oxide ($Al_2O_3$) powders and a palladium binder, and a nominal 0.1 media grade porous HASTELLOY® C-22® support. (HASTELLOY® C-22® is a nickel-chromium-molybdenum-iron-tungsten alloy.)

A 6 inch (15.24 cm) long, 1 inch (2.54 cm) O.D. section of HASTELLOY® tube, welded to a section of non-porous 316L stainless steel tube on one end and a non-porous cap on the other end, was obtained from Mott Metallurgical Corporation. The support was cleaned and dried following the same procedure described in Example 1. The support was then oxidized at 700° C. in air for 12 hours. A graded support was then produced using the same procedures and the same alumina powder mixtures as described in Example 2.

The graded support was then surface activated by performing two times the surface activation cycle described in Example 1. The surface activated support was then plated with palladium for 3 hours (2 cycles of palladium plating, as described in Example 1 with no vacuum applied). A third cycle of palladium plating was performed without vacuum for the first 40 minutes and pulling a vacuum in the tube side during the last 50 minutes.

After the last plating and rinsing with DI water, the membrane was dried for 2 hours at 120° C. The thickness of the palladium layer after these steps was 7.7 microns (determined gravimetrically). The helium leak of the membrane after the total of 4.5 hours of palladium plating was $8.9 \times 10^{-4}$ $m^3/(m^2 \text{ hour bar})$ and the membrane was considered dense.

The permeability of this membrane reached 21.5 $[m^3/(m^2 \text{ hour bar}^{0.5})]_{STP}$ at 250° C. after 150 hours in hydrogen. The selectivity ($H_2$/He) at 250° C. was 2016. The membrane showed hydrogen permeance of 28.5 $[m^3/(m^2 \text{ hour bar}^{0.5})]_{STP}$ at 300° C., 33.6 $[m^3/(m^2 \text{ hour bar}^{0.5})]_{STP}$ at 350° C., 38.3 $[m^3/(m^2 \text{ hour bar}^{0.5})]_{STP}$ at 400° C., 43.5 $[m^3/(m^2 \text{ hour bar}^{0.5})]_{STP}$ at 450° C., and 50 $[m^3/(m^2 \text{ hour bar}^{0.5})]_{STP}$ at 500° C. The selectivity of the membrane decreased from 2016 at 250° C. to 42 at 500° C. However, the large helium leak was likely due to a blister in the welding between the porous part of the support and the non-porous part. The module was repaired as described in Example 4, below.

Example 4

After hydrogen characterization (which lasted 743 hours), the membrane produced as described in Example 3 was repaired. The surface of the membrane was examined and large blisters were found at the interface between the porous parts and the non-porous parts of the support. The surface of the membrane was masked using polytetrafluoroethylene tape, and palladium was plated for 6 hours locally on the welds between the porous HASTELLOY® C-22® support and the non-porous parts. After local palladium plating of the two welds, the helium leak dropped to 0.006 $[m^3/(m^2 \text{ hour bar})]_{STP}$ at room temperature. Finally, the support was unmasked and the total surface was activated with three surface activation cycles using the procedure described in Example 1 while applying a vacuum to the tube side of the support and a last palladium plating cycle (1.5 hours) was performed. The thickness of the membrane after repair was about 10 microns and the helium leak was undetectable.

The permeability of this membrane reached 14.8 $[m^3/(m^2 \text{ hour bar}^{0.5})]_{STP}$ at 250° C. after 47 hours in hydrogen. The membrane was then slowly heated (0.5° C./min) to 500° C. and the hydrogen permeance was measured to be 40.6 $[m^3/(m^2 \text{ hour bar}^{0.5})]_{STP}$ at 500° C. After 200 hours in hydrogen at 500° C., helium was introduced in the reactor to measure the helium leak. The helium leak was 0.00064 $[m^3/(m^2 \text{ hour bar})]_{STP}$ so that the selectivity ($H_2$/He) was 27000. Hydrogen was then reintroduced for another 270 hours. After the 270 hours, the permeance was 41.2 $[m^3/(m^2 \text{ hour bar}^{0.5})]_{STP}$ and the selectivity (after switching to helium) was 2400. After another 285 extra hours in hydrogen (with 4 changes $H_2$—He—$H_2$), the membrane had a permeance of 42.5 $[m^3/(m^2 \text{ hour bar}^{0.5})]_{STP}$ and a selectivity of 600. To conclude, the repaired module was stable at 500° C. for 755 hours and the final permeance was 42.5 $[m^3/(m^2 \text{ hour bar}^{0.5})]_{STP}$ with a selectivity of 600.

Example 5

This example describes the fabrication of a composite structure having a dense hydrogen-selective membrane, an intermediate layer that included preactivated aluminum oxide ($Al_2O_3$) powders and a palladium binder, and a nominal 0.1 media grade porous HASTELLOY® C-22® support.

A 6 inch (15.24 cm) long, 1 inch (2.54 cm) O.D. section of HASTELLOY® tube, welded to a section of non-porous 316L stainless steel tube on one end and a non-porous cap on the other end, was obtained from Mott Metallurgical Corporation. The support was cleaned and dried following the same procedure described in Example 1. The support was then oxidized at 700° C. in air for 12 hours.

Three different powders were prepared as described below.

Powder No. 1 (coarse powder) was γ-alumina powder with an average particle size of 3 microns (SPA-Gamma-AF CERALOX® high purity aluminum oxide, Sasol North America, Inc., Houston, Tex.). Powder No. 2 (fine powder) was $Al_2O_3$ with an average particle size of 0.3 micron (10-20 γ (gamma) phase, Alfa Aesar). Powder No. 3 (very fine powder) was $Al_2O_3$ with an average particle size of 0.01-0.02 micron (80-95 γ (gamma) phase, Alfa Aesar).

10 g of the coarse powder, 10 g of the fine powder, and 5 g of the very fine powder were separately surface activated using the following procedure. Each powder was placed in a separate 500 mL cylinder containing 250 mL of aqueous $SnCl_2$ solution (1 g/L, pH=2). This step of sensitizing the powder was performed in an ultrasonic bath at 60° C. for 10 minutes. After 10 minutes, 250 mL of aqueous $PdCl_2$ solution (0.1 g/L, pH=2) were added into the cylinder already containing the aqueous $SnCl_2$ solution and alumina powder. The resulting slurry, with a total volume of about 500 mL, became brown instantly. The slurry was placed in an ultrasonic bath at 60° C. for 10 minutes. The resulting surface activated powder was then filtered from the slurry by using one filter paper (WHATMAN® GF/F type) for every 50 mL of slurry. Therefore, each filter paper contained about 1 g of preactivated coarse powder, about 1 g of preactivated fine powder, or about 0.5 g of preactivated very fine powder. The filter cakes, 30 in number, were dried at 120° C. for 2 hours.

1 g of the pre-activated coarse powder (i.e., 1 filter paper with its cake) was mixed with 450 mL of water at pH 2 to form a slurry which was then placed in ultrasonic bath to homogenize the alumina suspension. After 1 minute, the filter paper was removed from the slurry using a glass rod. The oxidized support was then placed into the slurry and a vacuum was pulled (using an aspirator) from the inside of the tube. After 30 seconds, a gray deposit formed on the porous section of the support. Extra alumina cake was removed by gloved hand while gently rinsing with distilled water while the tube side vacuum was maintained. The support was then dipped for 4 additional seconds in the slurry. Then, the support was plated with palladium for 15 minutes using a procedure similar to that described in Example 1 using 400 mL of plating solution and with no vacuum applied to the support.

Following deposition and plating of the preactivated coarse powder, the support was immersed for 20 to 30 seconds in a 450 mL water slurry containing 1 g of the preactivated fine powder while a vacuum was applied to the inside of the support. An alumina cake formed on the support. Extra alumina cake was removed by gloved hand while gently rinsing with distilled water while a vacuum was applied to the inside of the support. The support was then dipped for 5 additional seconds in the slurry. Then, the support was again plated with palladium, as described above, for 10 minutes.

Following the deposition and plating of the preactivated fine powder, the support was immersed for 30 seconds in a 450 mL water slurry containing 0.5 g of the preactivated very fine powder while a vacuum was applied to the inside of the support. No extra alumina cake seemed to form using the preactivated very fine powder. The support was again plated with palladium, as described above, for 10 minutes. The support became black in color. Underneath the black layer, shiny gray palladium could be seen. This black powdery layer was readily removed. With gloved hands the very fine black powder was used to polish the surface of the support. After 5-10 minutes of rubbing the surface, the support was rinsed with deionized water to remove the black particles. Once the shiny gray surface was visible, the support was plated with palladium for another 10 minutes. Finally, the support was dried at 120° C. for 4 hours.

The support was then masked with polytetrafluoroethylene tape, letting only 2 mm of the porous section of the tube and 5 mm of the non-porous section of the tube visible. To increase the adhesion between palladium and the tube, the oxide layer on the tube weld was removed by dipping the masked support in 400 mL of 1 M HCl. The surface was gently rubbed with gloved hands to ease the oxide removal. The support was surface activated using with 2 activation cycles and palladium was plated to the welding zones for 1.5 hours using a procedure similar to that described in Example 1 under vacuum. Then, the support was dried at 120° C. for 4 hours.

Finally, the support was unmasked and the surface was activated with two surface activation cycles using the procedure described in Example 1. Then, the support was palladium plated for 3 hours (2 cycles of 1.5 hours) wherein 400 mL of plating solution was used for each cycle. A third palladium plating cycle, lasting 1 hour, was performed while a vacuum was applied to the tube side of the support. A palladium layer formed that was only 3.9 microns thick (determined gravimetrically). The helium leak was measured to be 0.0024 $[m^3/(m^2 \text{ hour bar})]_{STP}$. The membrane was considered to be dense.

Equivalents

While this invention has been particularly shown and described with references to preferred embodiments thereof, it will be understood by those skilled in the art that various changes in form and details may be made therein without departing from the scope of the invention encompassed by the appended claims.

We claim:

1. A method for fabricating a composite gas separation module, comprising the steps of:
    a) depositing a preactivated powder over a porous substrate;
    b) depositing a binder metal in a uniform distribution throughout the preactivated powder; and
    c) depositing a dense hydrogen-selective membrane that is not materially breached by regions or points which impair the separation of hydrogen by allowing the passage of an undesired gas to overlie the preactivated powder and binder metal, thereby forming the composite gas separation module.

2. The method of claim 1 wherein the preactivated powder has an average particle diameter ranging from about 0.01 to about 5 microns.

3. The method of claim 1 wherein the preactivated powder is selected from the group consisting of preactivated metal powders, preactivated metal oxide powders, preactivated ceramic powders, preactivated zeolite powders, and combinations thereof.

4. The method of claim 3 wherein the preactivated powder includes preactivated aluminum oxide particles.

5. The method of claim 1 further including the step of surface activating a powder to form the preactivated powder.

6. The method of claim 5 wherein surface activating the powder to form the preactivated powder includes seeding the powder with nuclei of a hydrogen-selective metal.

7. The method of claim 6 wherein the powder is seeded with nuclei of a hydrogen-selective metal using an aqueous activation solution.

8. The method of claim 6 wherein the hydrogen-selective metal is palladium.

9. The method of claim 1 wherein the porous substrate is a porous metal substrate.

10. The method of claim 9 further including the step of oxidizing the surface of the porous metal substrate prior to depositing the preactivated powder.

11. The method of claim 1 further including the step of depositing a powder over the porous substrate prior to depositing the preactivated powder.

12. The method of claim 11 wherein the powder has an average particle diameter ranging from about 1 to about 5 microns.

13. The method of claim 11 wherein the powder includes aluminum oxide particles.

14. The method of claim 11 wherein the powder is deposited from a slurry.

15. The method of claim 1 wherein the preactivated powder is deposited from a slurry.

16. The method of claim 15 wherein the slurry is a water-based slurry.

17. The method of claim 1 wherein depositing a binder metal onto the preactivated powder includes electrolessly plating the binder metal onto the preactivated powder.

18. The method of claim 1 wherein the binder metal is a hydrogen-selective metal or an alloy thereof.

19. The method of claim 1 wherein the binder metal is palladium or an alloy thereof.

20. The method of claim 1 further including the steps of:
a) depositing an additional preactivated powder over the deposited preactivated powder and binder metal; and
b) depositing an additional binder metal onto the additional preactivated powder; wherein the dense hydrogen-selective membrane is deposited to overlie the additional preactivated powder and the additional binder metal.

21. The method of claim 20 wherein the additional preactivated powder has an average particle size that is smaller than the average particle size of the preactivated powder.

22. The method of claim 20 wherein the preactivated powder has an average particle diameter ranging from about 0.3 to about 3 microns.

23. The method of claim 20 wherein the additional preactivated powder has an average particle diameter ranging from about 0.01 to about 1 micron.

24. The method of claim 1 further including the step of exposing porous substrate anchoring sites following deposition of the preactivated powder over the porous substrate.

25. The method of claim 1 further including the step of exposing porous substrate anchoring sites prior to applying the dense hydrogen-selective membrane.

26. The method of claim 1 further including the step of surface activating the deposited preactivated powder and binder metal prior to depositing the dense gas selective membrane.

27. The method of claim 1 wherein applying the dense hydrogen-selective membrane includes plating palladium, or alloy components thereof, to overlie the preactivated powder and binder metal.

28. The method of claim 1 wherein the dense hydrogen-selective membrane includes palladium alloyed with at least one of the metals selected from the group consisting of copper, silver, gold, platinum, ruthenium, rhodium, yttrium, cerium and indium.

29. The method of claim 1 wherein applying the dense hydrogen selective membrane includes using a method selected from the group consisting of electroless plating, electroplating, thermal deposition, chemical vapor deposition, spray deposition, sputter coating, e-beam evaporation, ion beam evaporation and spray pyrolysis.

30. The method of claim 1 further including the step of treating the composite gas-separation module with hydrogen gas at a temperature of up to about 250° C.

31. The method of claim 30 wherein the pressure of the hydrogen gas ranges up to about 8 bar.

32. The method of claim 30 wherein the composite gas-separation module is treated with hydrogen gas for at least about 1 hour.

33. The method of claim 30 wherein the composite gas-separation module is treated with hydrogen gas for about 1 hour to about 4 hours.

34. A method for fabricating a composite gas separation module, comprising the steps of:
a) depositing a preactivated powder over a porous substrate;
b) depositing a binder metal onto the preactivated powder;
c) depositing a dense gas-selective membrane to overlie the preactivated powder and binder metal, thereby forming the composite gas separation module; and
d) exposing porous substrate anchoring sites following the deposition of the preactivated powder over the porous substrate.

35. A method for fabricating a composite gas separation module, comprising the steps of:
a) depositing a preactivated powder over a porous substrate;
b) depositing a binder metal onto the preactivated powder;
c) depositing a dense gas-selective membrane to overlie the preactivated powder and binder metal, thereby forming the composite gas separation module; and
d) exposing porous substrate anchoring sites prior to applying the dense gas-selective membrane.

36. A method for fabricating a composite gas separation module, comprising the steps of:
a) depositing a preactivated powder over a porous substrate;
b) depositing a binder metal onto the preactivated powder;
c) depositing a dense gas-selective membrane to overlie the preactivated powder and binder metal by plating palladium, or alloy components thereof, to overlie the preactivated powder and binder metal, thereby forming the composite gas separation module.

* * * * *